United States Patent Office 2,853,456
Patented Sept. 23, 1958

2,853,456

GASOLINE REFORMING CATALYSTS PREPARATION

Wayne Thomas Barrett, Arnold, Md., assignor to W. R. Grace & Co., New York, N. Y., a corporation of Connecticut No Drawing. Application June 8, 1955
Serial No. 514,129

5 Claims. (Cl. 252—442)

This invention relates to gasoline reforming catalysts. In a specific aspect it relates to a method of preparing a supported platinum reforming catalyst. In another aspect it relates to a method of preparing a platinum reforming catalyst on a particular alumina base.

This application is a continuation-in-part of my U. S. patent application Serial No. 434,680, filed June 4, 1954, which is directed to a method of preparing a platinum on alumina reforming catalyst by impregnating an alumina base with fluosilicic acid and chloroplatinic acid. It has since been found that a superior platinum reforming catalyst can be prepared on a particular alumina by a novel method which is in certain limited respects similar to the method disclosed in my co-pending application. I have discovered that a superior catalyst results when I employ my novel impregnating method and a particular alumina base, namely, an alumina which is prepared by the action of a dilute solution of hydrogen peroxide upon amalgamated aluminum. The method of preparing the novel alumina is described and claimed in U. S. patent application Serial No. 514,125, of Charles E. Welling, filed June 8, 1955.

The catalyst of the present invention comprises an alumina base, prepared by the action of the dilute hydrogen peroxide solution upon amalgamated aluminum, having incorporated therewith about 0.01-1% fluorine and about 0.01-1% silica and having the requisite amount, usually 0.1-1% of platinum, uniformly distributed throughout the alumina. The platinum concentration will always be the minimum per cent by weight which will produce the desired upgrading of the feedstock. The novel method of preparing the catalyst comprises incorporating small amounts of silica and fluorine with the alumina base simultaneously with the incorporation of a platinum compound, and uniform deposition of the platinum throughout the base. The finished catalyst is capable of producing higher octane reformates than conventional alumina-platinum, alumina-halogen-platinum catalysts, or catalysts prepared by the method of my co-pending application upon other alumina bases.

As hereinabove set forth, the catalyst of the present invention comprises the particular alumina, fluorine, platinum and up to about 1% by weight silica. The base, or that part of the present catalyst exclusive of metallic platinum, is not to be confused with conventional silica-alumina cracking components which are often employed as reforming catalyst bases, as disclosed in Patents No. 2,550,531, No. 2,651,598, and in Patent No. 2,478,916. In these patents the silica content of the base is of the order of at least 80% by weight, and alumina is present in amounts up to about 20%. The silica-alumina cracking component bases of the prior art contain a major portion of silica. The present invention contemplates a catalyst base containing a major proportion of the particular alumina, up to 1% fluorine, and not more than 1% by weight silica. The exact function of the small amount of silica and the manner in which it contributes to the effectiveness of this superior catalyst is not clearly understood. However, the small amount of silica indicated has a definitely beneficial effect upon the performance and stability of the catalyst.

The particular alumina base employed in the present invention is a hard, porous, high surface area alumina. It is prepared by contacting amalgamated aluminum with a dilute aqueous solution of hydrogen peroxide. The reaction between aluminum and hydrogen peroxide is allowed to continue, while agitating the mixture until the metal is consumed or until no more aluminum reacts. Agitation is then suspended and the mixture is allowed to stand for a period of time during which the newly formed alumina settles. A major portion of the supernatant liquid may then be decanted and the remaining liquid removed by filtration. Alternatively, upon completion of the reaction, the mixture may be charged to a filter without settling and decantation and the alumina recovered as a wet filter cake. In either case the filter cake is then dried to form a very hard, porcelain-like, yet porous alumina which is easily broken and sized and which may then be impregnated in accordance with the method of the present invention. If desired, the filtered alumina may be mixed with a solution of the impregnating compounds to form a thick paste which may then be easily extruded or shaped without a binder.

The degree of hardness of the alumina is a function of the concentration of hydrogen peroxide in the treating solution. The most desirable alumina from the standpoint of hardness, porosity and surface area is prepared with hydrogen peroxide solutions containing 1–4% by weight $H_2O_2$. As the hydrogen peroxide concentration in the solution is increased above 4%, the hardness of the alumina decreases rather sharply, and the resulting alumina is not a satisfactory catalyst base. In most instances, the hydrogen peroxide solution concentration is desirably about 3% by weight of $H_2O_2$.

The hardness of the alumina is also related to the weight ratio of amalgamated aluminum to hydrogen peroxide solution of any given $H_2O_2$ concentration. Within the above specified limits, the hard, porous, alumina particularly well suited as a platinum reforming catalyst base can be prepared when the initial weight ratio of aluminum to hydrogen peroxide solution is between about 1:100 and 1:25. Employing a solution containing about 3% by weight $H_2O_2$, the weight ratio of aluminum to hydrogen peroxide solution is desirably between about 1:60 and 1:80.

In accordance with the present invention, the alumina thus prepared is impregnated simultaneously with platinum, fluorine and silica from a mixed aqueous solution of a readily soluble platinum compound, such as chloroplatinic acid, and a soluble silicon and fluorine-containing compound, namely fluosilicic acid. Each of the components of the mixed solution, e. g. chloroplatinic acid and fluosilicic acid, are present in amount sufficient to incorporate the above-specified quantities of platinum, fluorine, and silica. Following impregnation, the alumina is dried and then the adsorbed platinum compound is converted to metallic platinum by reduction in a stream of hydrogen at about 300°–600° F., or by calcination in air at about 800°–1200° F.

While platinum, fluorine and silica are always simultaneously incorporated with the alumina, the present invention is not limited to any particular physical configuration or size of the alumina treated. For example, the newly formed alumina may be impregnated with the mixed solution prior to initial drying, as by forming a paste with a small volume of impregnating solution and extruding to form strands which may be dried and cut to uniform size. Alternatively, the particular alumina may be dried and ground to a very fine powder, which is then treated with a solution of chloroplatinic acid and fluosilicic acid. The impregnated powder may then be fed to a pilling machine and the resulting pellets calcined or reduced in hydrogen to form the final catalyst. On the other hand, the particular alumina may be shaped or pilled (1/8" x 1/8" to 1/2" x 1/2") or coarsely ground (6–12 mesh) prior to impregnation. In many instances this latter procedure is preferred because platinum losses are at a minimum. When alumina is impregnated prior to shaping, there is considerable dusting and breakage during subsequent pilling or cutting of the extrusions, and the losses of platinum are significant.

In order to uniformly impregnate the individual pills or similar shapes or coarsely ground alumina granules throughout with platinum either by spraying or immersion techniques, it is necessary that the mixed impregnating solution be acidified with hydrochloric acid. If this step is not taken, virtually the entire platinum content of the individual alumina pills or granules is concentrated in a thin layer on the surface, and the catalysts so formed are not considered satisfactory from the standpoint of activity or catalyst life. An impregnating solution containing in addition to chloroplatinic acid and fluosilicic acid sufficient hydrochloric acid to form a solution between 0.1 and 1.0 Normal with respect to HCl will effect uniform platinum distribution within the alumina pills or granules. The impregnating solution is desirably between about 0.4 and 0.6 Normal with respect to HCl. The addition of HCl is unnecessary when very finely ground or undried alumina is impregnated with the mixed solution.

The present invention will be more fully understood from the following non-limiting examples.

*Example I*

A quantity of the particular alumina employed as the catalyst base in the present invention was prepared as follows:

Granulated aluminum in the amount of 270 g. was amalgamated by immersion in 300 ml. of a 0.4% solution of mercuric chloride. Following amalgamation, the aluminum was repeatedly washed with water and then added to a 16 liter battery jar equipped with a powerful stirrer and containing a mixture of 1.125 liters of 30% hydrogen peroxide solution and 11.25 liters of water. The mixture was agitated for 24 hours, after which a small amount of aluminum remaining unreacted was removed, and the alumina was filtered from the reaction mixture. The filter cake was dried for 48 hours at 230° F. to yield an extremely hard, compact, yet porous alumina product. The product was calcined for a period of four hours at 800° F. X-ray diffraction analysis indicated that it consisted of a mixture of apha alumina monohydrate and a gamma-type alumina. The calcined alumina had the following properties:

Surface area _____ M.$^2$/g __ 243
Pore volume _____ cc./g __ 0.49
Pore diameter _____ A __ 81
Particle density _____ g./cc __ 1.08

*Example II*

A catalyst, hereinafter referred to as catalyst 1, was prepared as follows: A portion of the alumina of Example I was crushed and sized 8–12 mesh. An impregnating solution was prepared by adding 1 N HCl to 1.4 ml. of chloroplatinic acid (containing 0.311 g. Pt./ml.) to a total volume of 75 ml. To this solution there was added 1.7 ml. of a 22% fluosilicic acid solution. The impregnating solution was added to 70 g. of the sized alumina contained in an evaporating dish, and approximately 10–15 ml. of excess impregnating solution remained after saturation of the base. The contents of the evaporating dish were warmed almost to the boiling point and stirred for 20 minutes so that the impregnated alumina was constantly wetted by the excess solution. The impregnated alumina was then removed from the solution and dried for about 4 hours at about 230° F. Adsorbed platinum was converted to the metallic state by reduction in a stream of hydrogen at about 450° F. to form the finished catalyst.

Examination of the cross sections of broken catalyst granules showed them to be uniformly impregnated with platinum. Catalyst 1 contained 0.374% Pt., 0.15% F., about 0.1% SiO$_2$, alumina and chlorine. The chlorine content was not determined by analysis.

*Example III*

Another catalyst, hereinafter referred to as catalyst 2, was prepared on the alumina of Example I in accordance with the method of Example II, with the exception that the adsorbed platinum values were converted to metallic platinum by calcination in air instead of by hydrogen reduction. Following drying at about 230° F., the impregnated alumina was heated in a stream of air for a period of 1½ hours during which the temperature of the alumina was raised from 500° F. to 1100° F. The catalyst was then maintained in the air stream for 1 hour at 1100° F.

Catalyst 2 was found to be uniformly impregnated with metallic platinum, and analyzed 0.45% Pt., 0.15% F., and about 0.1% SiO$_2$. Chlorine was not determined. Catalysts 1 and 2, both prepared in accordance with the method of the present invention, contained essentially the same amount of platinum, but differed from each other in the method of conversion of the adsorbed platinum compound to metallic platinum.

In order to establish the superiority of catalysts prepared in accordance with the present invention over catalysts prepared without simultaneous impregnation with platinum, fluorine and silica, three catalysts were prepared on the same superior alumina base for comparison.

*Example IV*

A catalyst, hereinafter referred to as catalyst 3, was prepared on alumina prepared as described in Example I in accordance with the method set forth in Example II, with the exception that the impregnating solution did not contain any fluosilicic acid. It consisted only of 1.4 ml. of chloroplatinic acid made up to 75 ml. with 1 N HCl. The impregnated alumina was treated in a stream of hydrogen to effect reduction to metallic platinum. Catalyst 3 contained 0.403% platinum uniformly distributed throughout. In this respect it was similar to catalysts 1 and 2. However, catalyst 3 contained no fluorine nor silica.

*Example V*

Two additional comparative catalysts, hereinafter referred to as catalysts 4 and 5, were prepared on the same superior alumina as catalysts 1, 2 and 3.

Catalyst 4 was prepared by spraying 125 g. of alumina prepared as described in Example I with 95 ml. of a solution of chloroplatinic acid made by diluting with water 2.4 ml. of chloroplatinic acid containing 0.311 g. Pt./ml. The impregnated alumina was dried for 16 hours at 230° F. and reduced with hydrogen for 2 hours at 450° F. Examination of the finished catalyst showed that platinum was distributed only in a very thin skin on the surface of the granules. Catalyst 4 contained 0.664% platinum, considerably more than catalysts 1, 2 or 3.

Catalyst 5 was prepared by impregnating 84 g. of alumina, prepared by the method of Example I, by immersion in 95 ml. of chloroplatinic acid solution, prepared by diluting 1.2 ml. of chloroplatinic acid containing 0.311 g. Pt./ml. with water. Rapid selective adsorption occurred. The impregnated alumina was dried and reduced by the method described for catalyst 4. The finished catalyst 5 contained 0.453% platinum which was deposited as a thin layer on the outer surface of the alumina granules. With respect to depth of platinum impregnation, catalyst 5 was similar to catalyst 4. The platinum concentration of catalyst 5 was of the order of catalysts 1, 2 and 3.

Example VI

Each of the catalysts 1 to 5 was tested for its ability to upgrade a low octane gasoline under actual reforming conditions. The feed stock was an East Texas naphtha having the following properties:

| | |
|---|---|
| API gravity at 60° F | 56–57 |
| CFR-Research octane No | 54–57 |
| ASTM distillation: | |
| Overpoint F | 178° |
| 10% F | 212° |
| 50% F | 255° |
| 90% F | 319° |
| 95% F | 330° |
| Endpoint F | 350° |

Each catalyst was tested in the same manner by passing a mixture of hydrogen and the above naphtha over a bed of 75 ml. of the catalyst in a tubular reactor. The inlet temperature was 940° F. and the pressure 500 p. s. i. The hydrogen to hydrocarbon ratio was 10:1, and the liquid hourly space velocity was 3.0. Samples of the reformate were withdrawn after 72 and 200 hours on stream and the octane number determined. The following table presents the results of these tests.

| Catalyst No. | Pt | Analysis F | (Wt. percent) $SiO_2$ | HCl in Impregnating Solution | Platinum Distribution | C. F. R.—R. O. No. | |
|---|---|---|---|---|---|---|---|
| | | | | | | 72 hrs. | 200 hrs. |
| 1 | 0.374 | 0.15 | 0.1 | Yes | Uniform | 95.6 | 93.0 |
| 2 | 0.45 | 0.15 | 0.1 | Yes | do | 94.4 | 92.3 |
| 3 | 0.403 | 0 | 0 | Yes | do | 91.3 | 88.0 |
| 4 | 0.664 | 0 | 0 | No | Surface Only | 85.8 | 84.1 |
| 5 | 0.453 | 0 | 0 | No | do | 84.7 | 84.3 |

Each of the catalysts 1, 2 and 3, having platinum uniformly distributed throughout, is superior to catalysts 4 and 5 which contain platinum only on the surface. Catalyst 1 produced a reformate approximately 10 octane numbers higher than catalyst 4, which contained nearly twice as much platinum. Catalysts 1 and 2, prepared in accordance with the method of the present invention, are definitely superior to catalyst 3, which was prepared without fluosilicic acid in the impregnating solution.

I claim:

1. A method of preparing a gasoline reforming catalyst comprising the steps of contacting amalgamated aluminum with a dilute aqueous solution of hydrogen peroxide, separating the newly formed alumina from the supernatant liquid, contacting said alumina with an impregnating solution comprising chloroplatinic acid and fluosilicic acid in amount sufficient to form a final catalyst containing 0.1–1.0% platinum, 0.01–1.0% fluorine, and 0.01–1% silica, drying the thus impregnated alumina, and converting the adsorbed platinum compound to metallic platinum.

2. A method of preparing a gasoline reforming catalyst comprising the steps of contacting amalgamated aluminum with an aqueous hydrogen peroxide solution containing 1–4% by weight $H_2O_2$ in a weight ratio of aluminum to hydrogen peroxide solution between 1:25 and 1:100, separating the newly formed alumina from the supernatant liquid, contacting said alumina with an impregnating solution comprising chloroplatinic acid and fluosilicic acid in amount sufficient to form a final catalyst containing 0.1–1.0% platinum, 0.01–1.0% fluorine and 0.01–1% silica, drying the thus impregnated alumina, and converting the adsorbed platinum compound to metallic platinum.

3. A method of preparing a gasoline reforming catalyst comprising the steps of contacting amalgamated aluminum with an aqueous hydrogen peroxide solution containing 1–4% by weight $H_2O_2$ in a weight ratio of aluminum to hydrogen peroxide solution between 1:25 and 1:100, separating the newly formed alumina from the supernatant liquid, contacting said alumina with an impregnating solution consisting essentially of chloroplatinic acid, fluosilicic acid and hydrochloric acid, said impregnating solution being 0.1–1.0 Normal with respect to hydrochloric acid, in amount sufficient to form a final catalyst containing 0.1–1.0% platinum, 0.01–1.0% fluorine and 0.01–1% silica, drying the thus impregnated alumina, and converting the adsorbed platinum compound to metallic platinum in a stream of air at about 800°–1200° F.

4. A method of preparing a gasoline reforming catalyst which comprises contacting alumina prepared by the action of dilute aqueous hydrogen peroxide upon amalgamated aluminum with a dilute impregnating solution comprising chloroplatinic acid and fluosilicic acid in amount sufficient to form a final catalyst containing 0.1–1.0% platinum, 0.01–1.0% fluorine and 0.01–1.0% silica, drying the thus impregnated alumina at 200°–400° F. and converting the adsorbed platinum compound to metallic platinum.

5. A method of preparing a gasoline reforming catalyst which comprises contacting alumina prepared by the action of dilute aqueous hydrogen peroxide upon amalgamated aluminum with an impregnating solution consisting essentially of a 0.1–1.0 Normal hydrochloric acid, chloroplatinic acid and fluosilicic acid in amount sufficient to form a final catalyst containing 0.1–1.0% platinum, 0.01–1.0% fluorine and 0.01–1.0% silica, drying the thus impregnated alumina at 200°–400° F. and converting the adsorbed platinum compound to metallic platinum.

References Cited in the file of this patent

UNITED STATES PATENTS

| | | |
|---|---|---|
| 2,449,847 | Heard | Sept. 21, 1948 |
| 2,475,155 | Rosenblatt | July 5, 1949 |

FOREIGN PATENTS

| | | |
|---|---|---|
| 717,062 | Great Britain | Oct. 20, 1954 |

OTHER REFERENCES

Mellor's "Comprehensive Treatise on Inorganic Chemistry," vol. 5, New York (1924), pp. 204–206.